POLYESTERS OF DIHYDROXY POLYHEDRAL BORANE COMPOUNDS

James W. Dawes and John C. Sauer, Wilmington, Del., assignors to E. I. du Pont de Nemours and Company, Wilmington, Del., a corporation of Delaware
No Drawing. Filed Feb. 20, 1963, Ser. No. 260,346
14 Claims. (Cl. 260—75)

This invention relates to novel boron-containing polymers and their preparation. Specifically, the polymers of the invention are polyesters, including polyurethanes, of dihydroxy anionic $B_{10}$ and $B_{12}$ boron cage compounds having the hydroxy groups attached directly to the boron cage.

The many and varied uses of synthetic polymers underscores their importance in present-day technology and has stimulated the search for new polymers superior to or markedly different from those already known.

Recently, two closely related, completely new chemical entities, the polyhedral borane anions $B_{10}H_{10}^=$ and $B_{12}H_{12}^=$, together with their substitution products, have been reported [Knoth et al., J. Am. Chem. Soc. 84, 1056 (1962)].

There have now been made new types of polymers containing these anionic $B_{10}$ and $B_{12}$ nuclei, or "cages," as essential components. The polymers are prepared by reacting a dihydroxy derivative of an anionic $B_{10}$ or $B_{12}$ cage compound in which the hydroxy groups are directly attached to the boron cage with a complementary polyfunctional reactant defined in greater detail below.

The polymers of the invention may be described as polyesters, including polyurethanes, in which the diol component of the recurring unit has the formula

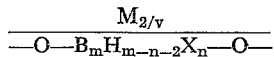

where M is a cation of valence $v$ defined in more detail below, the term "$2/v$" being a subscript that gives the number of M groups present; i.e., it is the ratio of M groups to one $—B_mH_{m-n-2}X_n—$ group;

X is a monovalent group bonded to boron selected from the class consisting of halogen, $—Q'$, $—OQ''$, $—OQ'''$, $—SQ''$ and $COQ''$, wherein $Q'$ is selected from the class consisting of alkyl and cycloalkyl each of at most 12 carbon atoms, $Q''$ is aliphatically saturated hydrocarbyl of at most 12 carbon atoms, and $Q'''$ is aliphatically saturated hydrocarbyl of at most 12 carbon atoms interrupted by one oxygen atom;

$m$ is 10 or 12; and $n$ is a cardinal number between 0 and $m-2$, inclusive; and when $n$ is greater than 1, the groups represented by X can be the same or different.

More specifically, the polymers can be described as having recurring units of the formula (1)
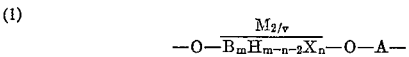

where M, $v$, X, $m$ and $n$ are defined as above and A is selected from the class consisting of (a) a divalent group remaining after removal of two acid halogens from a poly(carbacyl halide) having at most 18 carbon atoms, and (b) a divalent group remaining after removal of two acid halogens from a poly(acid halide) of a poly(oxyacid) whose central atom is an element of atomic number 14–16, inclusive.

The term "acid halogens" is intended to designate, and applies only to, the halogens of the acid halide functions. For example, in β-chloroadipoyl chloride, ClCOCH₂CH₂CHClCH₂COCl the chlorines bonded to the CO groups are "acid halogens"; the chlorine bonded to the β-carbon is not. The use of the term does not mean or imply that the halogens in question are themselves "acidic."

It should be noted that although A is defined as a group remaining after removal of acid halogens, the group A is not necessarily introduced into the polymers of the invention by reaction of an acid halide, although any of the polymers of the invention can be made in this way. This will be made increasingly clear in later sections.

As is seen from the definition of A, polymers containing recurring units of Formula 1 can be divided into two subclasses, depending on the nature of the group A. In one such subclass, A is a divalent group remaining after removal of two acid halogens from a poly(carbacyl halide), any inert portion of which is bonded to the carbons of the two reacting carbacyl groups through an element of atomic number 6–7. (A carbacyl halide is an acid halide in which the acidic halogen is bonded to carbon, i.e., a compound containing the group

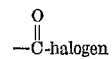

or the group

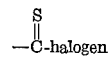

The term "inert portion" is defined in a later section.) In the other such subclass, A is a divalent group remaining after removal of two acid halogens from a poly(acid halide) of a poly(oxy acid) whose central atom, i.e., the atom to which the acid halogens are bonded, is an element of atomic number 14–16, inclusive.

A polymer of the first subclass defined above is prepared by reacting at least one dihydroxy derivative of a $B_{10}$ or $B_{12}$ cage compound with at least one complementary polyfunctional reactant containing at least two functional groups of the class consisting of carboxyl and ester-forming derivatives thereof, thiocarboxyl and ester-forming derivatives thereof, isocyanato, and isothiocyanato, any inert portion of the polyfunctional reactant being bonded to said (reacting) groups through an element of atomic number 6 to 7, i.e., carbon or nitrogen. Examples of such complementary reactants are (a) dicarboxylic acids and di(thiocarboxylic) acids;

(b) acyl halides, acyl cyanides, and esters of dibasic carboxylic and dibasic thiocarboxylic acids, including derivatives of carbonic and thiocarbonic acids; and (c) diisocyanates and diisothiocyanates.

By the term "inert portion," as used above, is meant a part of the molecule that is not involved in the polymerization reaction. For example, in a condensation polymerization reaction involving adipoyl chloride, ClCO—CH₂CH₂CH₂CH₂—COCl the —CH₂CH₂CH₂CH₂— group is not involved in the reaction and is thus an "inert portion" of the molecule. On the other hand, in a similar reaction involving carbonyl chloride, Cl—COCl, the first chloro group, Cl—, is involved in the polymerization reaction and is thus not an "inert portion"; in fact there is no inert portion, in the present sense of the term, in the carbonyl chloride molecule.

A polymer of the second subclass defined above is prepared by reacting at least one dihydroxy derivative of a $B_{10}$ or $B_{12}$ cage compound with at least one complementary polyfunctional reactant containing at least two acid halide groups bonded to an element of atomic number 14–16, inclusive, i.e., a poly(acid halide) of a poly(oxy acid) whose central atom is silicon, phosphorus, or sulfur.

More specifically, the first subclass of polymers of the invention can be defined as a polymer containing at least one type of recurring unit of the subgeneric formula (2) 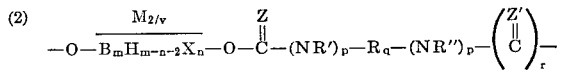

where M, $v$, X, $m$, and $n$ are as defined in Formula 1;

Z and Z' are the same or different and are oxygen or sulfur;

R is a divalent group of 2–16 carbon atoms selected from the class consisting of alkylene, cycloalkylene, cycloalkylenedialkylene, alkylenebis(cycloalkylene), arylene, aralkylene, alkarylene, alkylenediarylene and arylenedialkylene, in which any carbon chain can be interrupted by up to two separated heteroatoms selected from the class consisting of oxygen, sulfur, and nitrogen, said heteroatoms being removed by at least one carbon from the functional groups bonded to R;

R' and R'' are selected from the class consisting of individually, (a) hydrogen, and (b) aliphatically saturated hydrocarbyl of 1–8 carbon atoms selected from the group consisting of alkyl, cycloalkyl, alkylcycloalkyl, cycloalkylalkyl, aryl, aralkyl, alkaryl and alkaralkyl, and, when taken together, (c) alkylene of up to 8 carbon atoms;

$p$ and $q$ are the same or different and are 0 or 1; and $r$ is 0 or 1, being 0 only when $p$ and $q$ are 0.

Polymers of this subclass are made by one or either of two processes. In the first process, hereinafter referred to as Process I, at least one dihydroxy polyboron compound of the formula (3) 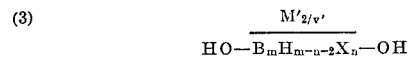

wherein M' is a cation of valence $v'$, defined in more detail below, the term $2/v'$ being a subscript that gives the number of M' groups present; and the other terms are as previously defined; is reacted with at least one compound of the formula (4) 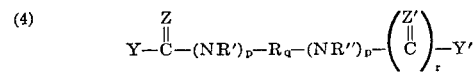

where Y and Y' can be the same or different and are aliphatically saturated hydrocarbyloxy, aliphatically saturated hydrocarbylthio, halogen, cyano, or, when $p=0$ and $r=1$, hydroxy; and the other terms are as defined above.

Compounds of Formula 3 can be represented alternatively as $$M'_{2/v'} \cdot B_mH_{m-n-2}X_n(OH)_2$$

In the second process, hereinafter referred to as Process II, which is used for polymers in which R' and R'' are hydrogen and $p$, $q$, and $r$ are 1, at least one compound of Formula 3 is reacted with at least one compound of the formula (5) $\quad$ ZCN—R—NCZ' where R, Z, and Z' are defined as above.

Similarly, the second subclass of polymers of the invention is that of Formula 1 in which the divalent group A is

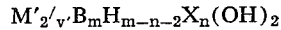

where Q is aliphatically saturated hydrocarbyl and X' is halogen. Polymers of this type are made by reacting at least one dihydroxy polyboron compound of Formula 3 with at least one dihalide of the formula (6) $\quad$ X'—A'—X'

(alternatively formulatable as A'X'$_2$), where A' is any of the divalent groups enumerated above in this paragraph and X' is halogen. This process is hereinafter referred to as Process III.

Among the poly(acid halides) described in Formula 1, the di(acid halides) are preferred.

It has already been stated that the polymers of the invention are polyesters, including polyurethanes (which are a special type of polyester). Since more than one dihydroxy polyboron compound and more than one complementary polyfunctional reactant can be used, the polymers of the invention include copolyesters, copolyurethanes, and copolyesterurethanes. Accordingly, there can be more than one type of repeating unit in a given polymer, although polymers prepared from only one of each type of reactant are preferred.

The polymers of the invention are characterized by the fact that on treatment with aqueous mineral acids, e.g., hydrochloric acid, they are hydrolyzed to give compounds of Formula 3, together with compounds of Formula 4 in which Y and Y' are hydroxyl and/or compounds of Formula 6 in which X' is hydroxyl. When $p=1$ in Formula 4, the initial hydrolysis product is a bis(carbamic acid) (or a thio derivative thereof), which immediately loses carbon dioxide (or carbon oxysulfide) to give the corresponding diamine, and the latter is the hydrolysis product actually isolated. (In the acid hydrolysis medium, the diamine exists as the corresponding mineral acid salt, which on treatment with alkali yields the free diamine.) When $p$, $q$, and $r$ in Formula 4 are zero, the initial hydrolysis product is carbonic acid (or thiocarbonic acid), which immediately decomposes to give carbon dioxide (or carbon oxysulfide), and the latter is the ultimate hydrolysis product.

The preferred polymers, particularly for use in preparing films and fibers, have molecular weights above 10,000. However, polymers of lower molecular weight, e.g., in the 3,000–10,000 range, can be used in making adhesives and coating compositions.

*Structural features of the polymers*

The novel feature of the polymers of the invention is the recurring entity (7) 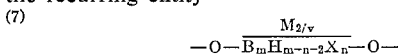

of Formulas 1 and 2. The intermediates of Formula 3, which are used to introduce this entity into the polymer molecules, are all derived from compounds containing $B_{10}H_{10}^=$ or $B_{12}H_{12}^=$ anions, referred to previously. Their preparations are discussed in a later section.

The group M in Formulas 1, 2, and 7 can be any of a wide variety of cations. For example, M can be a cation of any metal in the Periodic Table shown in Deming's "General Chemistry," fifth edition, page 156 (Wiley, 1944), i.e., a metal of Groups IA, IIA, IIIA, IVA, VA, VIA, IB, IIB, IIIB, IVB, VB, VIB, VIIB, or VIII. For example, M can be lithium, potassium, rubidium, cesium, beryllium, magnesium, calcium, barium, strontium, copper, mercury, aluminum, tin, bismuth, silver, zinc, vanadium, chromium, manganese, ruthenium, cobalt, nickel, or any other metal. Preferred metal cations are those having valences of 1, 2, or 3. Especially preferred metals, for reasons of availability, are those of Groups IA and IIA, i.e., alkali metals and alkaline-earth metals.

When the valence, $v$, of the cation, M, is greater than 2, the term $2/v$ becomes fractional. It will be understood by one skilled in the art that in such cases the term $M_{2/v}$ is used for convenience of expression only, that there are actually no fractional numbers of cations present in the polymer, and that therefore any amount of polymer containing a repeating unit of Formula 1 contains a whole number of cations. The same considerations apply to the terms M' and $v'$ of Formula 3.

M can also be an organic or organo-inorganic cation, for example, an ammonium, phosphonium, or sulfonium cation of the formula $U_2U'NH^+$, $U_3U'N^+$, $U'_4P^+$, or $U'_3S^+$, where U is aliphatically saturated hydrocarbyl bonded to the nitrogen, phosphorus, or sulfur through aliphatic carbon, U' is aliphatically saturated hydrocarbyl, and any two U and/or U' groups can be joined together, directly or through an oxygen heteroatom, to form an alkylene or oxygen-interrupted alkylene radical. ("Alkylene" as used here refers to a divalent, saturated, aliphatic hydrocarbon radical, e.g., ethylene, —$CH_2CH_2$—.) Because of easier availability, cations in which U and U' contain at most 12 carbons each and any alkylene group contains at most 12 carbons are preferred. Examples are triisopropylammonium, N-methylpiperidinium, N-hexylmorpholinium, pyridinium, trihexylammonium, diethyl-[2-($\beta$-naphthyl)ethyl]ammonium, N,N-dipropylanilinium, benzyltrimethylammonium, tetraisopentylammonium, didodecyldiethylammonium, butyldimethyl(phenyl)ammonium, 1,1-dimethylhexamethyleniminium, tetrabenzylphosphonium, ethyltriphenylphosphonium, tetramethylphosphonium, isobutylethylmethylpropylphosphonium, ethylpentamethylene-p-tolylphosphonium, tetra($\alpha$-naphthyl)phosphonium, triphenylsulfonium, methyltetramethylenesulfonium, benzyldodecylmethylsulfonium, methyldipentylsulfonium, and trimethylsulfonium. An especially preferred group of cations of this type are those in which the U and/or U' groups are the same and are lower alkyl, particularly the tetra(lower alkyl)ammonium cations.

M' in Formula 3 can be any of the cations recited above as values of M; and, correspondingly, a polymer of Formula 1 in which M is one of said cations can be made directly from a compound of Formula 3 in which M' is the same cation.

In addition, since the polymers of the invention are soluble in ionizing solvents such as dimethylformamide, dimethylacetamide, and N-methylpyrrolidone, the cation, M, in a polymer of Formula 1 can be replaced by any of an extremely wide variety of other cations by exchange reactions carried out by well-known techniques, including in particular the use of cation-exchange resins. Cations that can be introduced by these techniques include, for example, cations of the type recited above and also any of an extremely wide variety of other cations.

For example, by virtue of this possibility of cation-exchange, M in Formulas 1, 2, and 7 can be hydrogen, ammonium, or hydrazonium. As is the case with monomeric compounds containing the $B_{10}H_{10}^=$ and $B_{12}H_{12}^=$ ions and their substituted derivatives, when polymers of this invention in which M is hydrogen are prepared or worked with in the presence of electron-donor solvents or diluents, the polymers are ordinarily isolated as solvates, in which the solvated molecules are presumably associated with the hydrogen ions. Typical donor molecules of this type, i.e., molecules that can associate with hydrogen ions, are water, alcohols, ethers, nitriles, and carboxamides. An average of more or less than one such solvate molecule can be associated with a given hydrogen ion. When M is hydrogen, the presence or absence of solvate molecules, and the degree of solvation when such molecules are present, is not critical and is of no particular importance to the present invention. It is to be understood, therefore, that the term "hydrogen," as used here, i.e., as a value of M, includes hydrogen ions solvated with molecules of the types discussed above. This usage of the term "hydrogen" is based on nomenclature approved by the International Union of Pure and Applied Chemistry; see J. Am. Chem. Soc., 82, 5529–30 (1960).

M can also, for example, be a complex cation of any of the metals referred to above, e.g., tetramminecopper(II), diamminezinc(II), diaquotetramminechromium (III), tris(1,2 - propanediamine)chromium(III), nitratopentamminecobalt(III), dichlorobisethylenediaminecobalt (III), dicyclopentadienyliron(III), dibenzenechromium (I), and tris(acetylacetonato)silicon.

As a further example, M can also be any of a very broad class of substituted ammonium or hydrazonium cations represented by the formulas $U'NH_3^+$, $UU'NH_2^+$, $U'N_2H_4^+$, $U'_2N_2H_3^+$, $U'_3N_2H_2^+$, and $UU'_3N_2H^+$, where U and U' are as previously defined. Examples are methylammonium, cyclopropylammonium, 1 - methylheptylammonium, 2-(1-naphthyl)ethylammonium, diisobutylammonium, dicyclohexylammonium, dinonylammonium, morpholinium, dodecamethyleniminium, phenylhydrazonium, 1 - methyl - 1 - phenylhydrazonium, 1 - methyl-2-isopropylhydrazonium, dodecylhydrazonium, 1,1,2-triethylhydrazonium, 1,1,1 - triheptylhydrazonium, tetramethylhydrazonium, and tetrabenzylhydrazonium.

Because of availability, the preferred types of cations of those described in the preceding three paragraphs are hydrogen, ammonium, (lower alkyl)ammonium, and di(lower alkyl)ammonium.

As stated previously, the X substituents are halogen, (—Q'), (—OQ''), (—OQ'''), (—SQ''), or (—COQ''). Q' is alkyl or cycloalkyl of at most 12 carbons, Q'' is aliphatically saturated hydrocarbyl of at most 12 carbons, and Q''' is aliphatically saturated hydrocarbyl of at most 12 carbons interrupted by one oxygen. An especially preferred class is that in which any hydrocarbon moiety is saturated lower aliphatic hydrocarbon.

Examples of X substituents are fluorine, chlorine, bromine, iodine, ethyl, tert-butyl, cyclohexyl, octyl, dodecyl, 1-phenylethyl, methoxy, isopropoxy, cyclopentyloxy, phenoxy, 2-(2-naphthyl)ethoxy, 2-methoxyethoxy, 6-butoxyhexyloxy, 3-(p-tolyloxy)propoxy, ethylthio, isobutylthio, benzylthio, dodecylthio, acetyl, propionyl, isobutyryl, 2-octanoyl, benzoyl, cycloheptanecarbonyl, pivaloyl, 1-naphthoyl, and p-phenylbenzoyl.

Because of ease of preparation of intermediates, polymers in which the repeating unit of Formula 7 contains at most two X substituents other than halogen, and particularly those containing no substituents other than halogen, are preferred. The most easily prepared halogen-containing compounds are the relatively highly halogenated ones, i.e., those in which $n$ between $m$–7 and $m$–2, inclusive, and these compounds constitute a more preferred type. In the $B_{10}$ series, an especially preferred class is that in which $n$ is 7 or 8, i.e., $m$–3 or $m$–2. Chlorine is the preferred halogen, for reasons of its relatively low cost and ease of preparation of intermediates.

As stated previously, the group A in Formula 1 is introduced by reaction of a compound of formula (4) 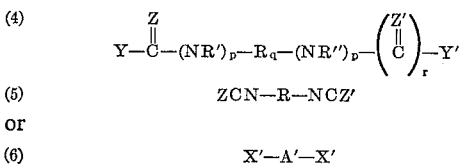

(5) ZCN—R—NCZ' or (6) X'—A'—X'

From the definitions of the terms given above, it will be seen that compounds of Formula 4 can include (a) dibasic carboxylic acids and dibasic thiocarboxylic acids;

(b) dibasic carboxylic acid derivatives, including acyl halides, thioacyl halides, esters, thiol esters, thione esters, acyl cyanides, and thioacyl cyanides, and including, specifically, carbonyl halides, carbonyl cyanide, carbonate esters, thiocarbonyl halides, thiocarbonyl cyanide, and thiocarbonate esters; and (c) bis(carbamoyl halides), bis(thiocarbamoyl halides), bis(thiocarbamate esters), and bis(dithiocarbamate esters).

The groups

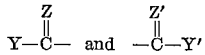

in the compounds of Formula 4 can be the same or different. For example, halide esters of dibasic acids and moonthiobis(acid chlorides) can be used. In addition, compounds containing one of the above functional groups and one isocyanate group can also be used. Preferably, because of ease of preparation, the two reactive functional groups in the complementary polyfunctional reactant of Formula 4 are the same, and polymers resulting from such intermediates are correspondingly preferred. Also, polymers in which Z and Z' are oxygen are preferred, since the required intermediates of Formula 4 are usually easier to prepare and more stable.

This is especially true when *p*, *q*, and *r* of Formula 2 all equal one.

R' and R" can be the same or different, and are exemplified by methyl, isopropyl, neopentyl, octyl, cyclopentyl, methylcyclohexyl, 2-cyclopentylethyl, phenyl, benzyl, p-tolyl, m-ethylphenyl, o-methylbenzyl, and phenethyl. It is also preferred, because of ease of preparation of the intermediate involved, that R' and R" be the same, hydrogen being an especially preferred value for both R' and R".

From the definitions of the terms given above, it will be seen that the compounds of Formula 5 can include diisocyanates, diisothiocyanates, and monothiodiisocyanates. Again because of ease of preparation, compounds of Formula 5 in which the functional groups are the same, together with the polymers therefrom, are preferred, diisocyanates being especially preferred.

An equally preferred class of intermediates of Formula 4, and, correspondingly, of polymers resulting from such intermediates, are those in which *p* and *q* are 0, and *r* is therefore 0 or 1, i.e., derivatives of carbonic and oxalic acids.

Examples of compounds of Formula 4 and 5 that can be used for making polymers of the invention are oxalic acid, glutaric acid, α- and β-tert-butyl adipic acid, 1,2-cyclohexanediacetic acid, 1,4-cyclohexanedicarboxylic acid, 1,3-cyclopentanedicarboxylic acid, 1,10-decanedicarboxylic acid, 1,7-(4-oxaheptane)dicarboxylic acid, piperazinediacetic acid, di(carboxymethyl) sulfide, 2,4'-biphenyldicarboxylic acid, diethyl carbonate, dipropyl oxalate, dimethyl terephthalate, diethyl dithiolsebacate, N,N'-diethoxycarbonylpiperazine, dimethyl N,N'-hexamethylenebis(dithiocarbamate), diphenyl azelate, ethyl hydrogen adipate, dimethyl-1,4-naphthalene(monothiol)-dicarboxylate, carbonyl fluoride, thiocarbonyl bromide, oxalyl chloride, adipoyl iodide, 1,3-cyclohexanedicarbonyl chloride, oxybis(4-benzeneacetyl bromide), N,N'-dipentyl-N,N'-hexamethylenebis(carbamoyl chloride), the mono acid chloride of suberic acid, ethyl ω-fluorocarbonyl valerate, thiobis(3-benzoyl chloride), N,N'-diisopropylethylenebis(carbamoyl chloride), 4,4'-diphenylylene(oxypropionyl fluoride), methyliminodipropionyl fluoride, adipoyl cyanide, hexamethylene diisocyanate, hexamethylene diisothiocyanate, 1,4-phenylene diisocyanate, propylene diisocyanate, 1,5-naphthylene diisocyanate, 4-methyl-1,3-benzenebis(carbamoyl chloride), hexamethylenebis(carbamoyl fluoride), 4,4'-oxybis-(benzenecarbamoyl chloride), ω-isothiocyanatooctyl isocyanate, ε-isocyanatocaproic acid, 3-chlorocarbonylphenyl isocyanate, 3,3'-oxybis(phenyl isocyanate), and 4,4'-di(isocyanatophenyl) sulfide.

Because of availability of intermediates, a preferred class of polymers of Formula 1 are those in which the A group, when introduced by use of a reactant of Formula 4 or 5, contains at most 18 carbons, and especially at most 10 carbons. When the group R contains one or more nitrogen heteroatoms, it is preferred that any such nitrogen be tertiary, i.e., that it be bonded solely to carbon, since the polymers from such intermediates have superior tractability.

From the definitions of terms given previously it will be seen that compounds of Formula 6 can include dihydrocarbylsilicon dihalides, $Q_2SiX'_2$; trihydrocarbylphosphorus dihalides, $Q_3PX'_2$; hydrocarbonphosphonic dihalides, $QP(=O)X'_2$; hydrocarbonthiophosphonic dihalides, $QP(=S)X'_2$; phosphoryl trihalides, $P(=O)X'_3$; thiophosphoryl trihalides, $P(=S)X'_3$; hydrocarbonphosphonous dihalides, $QPX'_2$; sulfuryl dihalides, $SO_2X'_2$; thionyl dihalides, $SOX'_2$; and sulfur dihalides, $SX'_2$; in which any organic unsaturation is aromatic, i.e., free of aliphatic unsaturation. These compounds can all be regarded, formally at least, as acid halides of the corresponding oxy acids, which are those compounds containing hydroxyl groups in place of the halide groups, X'. For this purpose of classification, it is not necessary that the corresponding acids be known, isolable compounds. Nor is it necessary that they have "acidic" properties in the usual sense of the word, i.e., that they be relatively strong acids such as sulfuric acid and acetic acid.

When the intermediates of Formula 6 contain Q groups, it is preferred that any such group be of 1–10 carbons, since the said intermediates are more easily available; the corresponding polymers also constitute a preferred class. Examples of such intermediates are diethylsilicon difluoride,
dimethylsilicon chloride fluoride,
methylphenylsilicon dichloride,
benzylethylsilicon dichloride,
di(tert-butyl)silicon dichloride,
pentamethylenesilicon dichloride,
dicyclohexylsilicon dichloride,
cyclohexylphenylsilicon dichloride,
di(p-tolyl)silicon dichloride,
diphenylsilicon dibromide,
triethylphosphorus dichloride,
benzyldiphenylphosphorus bromide chloride,
triphenylphosphorus dibromide,
tri(1-naphthyl)phosphorus dichloride,
methanephosphonic dichloride,
2-propanephosphonic dichloride,
2-methylbutanephosphonic dichloride,
o-toluenephosphonic dichloride,
2,5-dimethylphenylmethanephosphonic dichloride,
1-naphthalenephosphonic dichloride,
propanethiophosphonic dichloride,
benzenethiophosphonic dichloride,
ethanephosphonous dichloride,
2-methylpropanephosphonous dichloride,
benzenephosphonous dibromide,
α-toluenephosphonous dichloride,
m-toluenephosphonous dichloride,
2,4,6-trimethylbenzenephosphonous dichloride,
2-naphthalenephosphonous dibromide,
sulfuryl fluoride,
thionyl chloride,
and sulfur dichloride.

As will be seen from the foregoing examples, when there is more than one Q group present, said groups can be the same or different. Preferably they are the same, since the required intermediates are then easier to prepare; and the polymers from such intermediates are correspondingly preferred. An especially preferred value of Q is lower alkyl or phenyl, since the required intermediates are most readily available.

In all the various types of A' groups discussed above, including those both with and without Q groups, the preferred groups are dihydrocarbylsilicon, $Q_2Si$; hydrocarbonphosphonic, $QP(=O)$; and sulfuryl, $SO_2$; since polymers containing these groups are of superior stability.

Processes of the invention

In all Processes I, II, and III, as in most condensation-polymerization reactions, equivalent quantities of the dihydroxy polyboron compound of Formula 3 and the complementary reactant or reactants of Formulas 4, 5, and/or 6 are ordinarily used. Nonequivalent quantities can be used if desired, but polymers of relatively low molecular weight result.

In addition to the monomeric starting materials of Formulas 3, 4, 5, and/or 6, there can be present as reactants in the polymerization mixture cyclic esters, or lactones, that polymerize by ring-opening. The products of the invention therefore include copolymers containing repeating units derived from these cyclic monomers. Examples of such monomers are pivalolactone, ε-caprolactone, propiolactone, and thiopivalolactone.

Furthermore, compounds containing complementary ester-forming groups within the same molecule can be present as reactants in the polymerization mixture; and the products of the invention include copolymers containing repeating units derived from such compounds. Most of these compounds are hydroxy-substituted or thiol-substituted aliphatically saturated hydrocarboncarboxylic acids or ester-forming derivatives thereof of up to 18 carbon atoms. Examples of such additional starting materials include lactic acid, ε-mercaptocaproic acid, 12-hydroxyoctadecanoic acid, methyl hydroxy acetate, and p-(2-hydroxyethyl)benzoic acid.

Ordinarily, in the resulting polymers, the recurring units arising from the types of compounds described in the preceding two paragraphs do not exceed 50 mole percent of the total recurring units.

In addition, a part of the dihydroxy polyboron compound of Formula 3 can be replaced by an equivalent amount of a diol in which both hydroxyl groups are bonded to carbon instead of to boron; the copolymers thus produced are also included in the products of the invention. These diols are preferably aliphatically saturated hydrocarbondiols, i.e., glycols, of up to 18 carbon atoms in which the hydrocarbon moieties may be interrupted by separated oxygen, nitrogen, or sulfur heteroatoms, any such heteroatom being separated from the hydroxyl oxygens by at least two carbons. Examples of such diols are ethylene glycol, propylene glycol, octamethylene glycol, hexadecamethylene glycol, 1,2-cyclopentanediol, 3,6-dioxaoctamethylene glycol (triethylene glycol), 3-thiapentamethylene glycol, and di(2-hydroxyethyl)(methyl)amine. Ordinarily, the amount of such a diol present does not exceed 50 mole percent of the total diol content.

The repeating units derived from the lactones, hydroxy acids, mercapto acids, and carbon-bonded diols discussed above are not critical features of the invention, and accordingly any of a wide variety of these compounds can be used in preparing copolyesters, copolyurethanes, and copolyesterurethanes.

In any of the processes described above, in addition to the reactants and coreactants described in the foregoing paragraphs, small amounts of monoalcohols, monocarboxylic acids or ester-forming derivatives thereof, or monoisocyanates can be added to the polymerization mixtures to control the molecular weights of the polymers produced. In the same manner, small amounts of compounds containing more than two hydroxyl groups, more than two carboxyl groups or ester-forming derivatives thereof, more than two isocyanate groups, or any combination of such carboxyl, carboxyl derivative, and isocyanate groups totaling more than two, can be added to the polymerization mixtures to effect desirable degrees of cross-linking of the polymers. Both these methods of affecting the natures of the polymers produced are well known in the art.

When an acid halide is used as a coreactant with the dihydroxy polyboron compound of Formula 3, i.e., when the coreactant is a compound of Formula 6 or one of Formula 4 in which Y and/or Y' are halogen, an acid acceptor can be used if desired to take up the hydrogen halide formed in the polymerization reaction.

Operable acid acceptors include tertiary amines (including diamines), i.e., amines in which the nitrogen or nitrogens are bonded solely to carbon. Because of availability, basicity, and the absence of side reactions when they are used, aliphatically saturated tertiary amines, including heterocyclic amines, containing only carbon, hydrogen, and nitrogen, having at most 18 carbons, and containing at most one aryl group bonded to nitrogen are preferred. Examples are triethylamine, methyldihexylamine, triethylenediamine, N,N'-tetraethylhexamethylenediamine, N,N'-tetramethylethylenediamine, triisobutylamine, cyclopentyldiethylamine, tricyclohexylamine, dodecyldipropylamine, N-ethylpyrrolidine, N-undecylpiperidine, N-methylhexamethylenimine, dimethylbenzylamine, dipentyl(phenethyl)amine, N,N-dimethylaniline, pyridine, quinoline, and 5-ethyl-2-methylpyridine. An especially easily available group within the class just described comprises mono(tertiary amines) of at most 12 carbons, and these therefore, constitute an especially preferred class of acid acceptor. When an acid acceptor is used, the cation that it forms on combination with a proton (hydrogen ion) can and sometimes does replace the cation, M', present in the starting material of Formula 3.

Another type of acid acceptor that can be used is an alkali-metal fluoride, sodium fluoride being preferred for economic reasons.

When an acid acceptor is used, the amount is customarily at least equivalent to the total amount of hydrogen halide capable of being formed, i.e., at least one equivalent of proton acceptor per acid halogen is customarily present. There is no upper limit on the amount of proton acceptor that can be used, and an upper limit is suggested only by problems of solubility, volatility, and removal of excess proton acceptor. In practice, there is little or no advantage to be gained by using more than 25 equivalents of acid acceptor per acid halogen, except where a larger amount is useful strictly as a solvent, and ordinarily the ratio will be between 1 and 5. The point at which the acid acceptor is added is not critical. Preferably it is added at or near the start of the process, especially when a solvent is used and the nature of the polymer and the solvent is such that the polymer precipitates during the process.

A solvent or diluent is not required for any of the processes, since polymerization even of reactants that are solids at ordinary temperatures can be brought about by heating to high enough temperatures. To permit operation at lower temperatures, however, and in some cases to moderate the reaction between reactive starting materials, an inert solvent or diluent or mixture thereof is frequently used. In general, any liquid free of groups that react with carboxylic acids, acid halides, acid cyanides, esters, isocyanates, isothiocyanates, alcohols, or thiols in the absence of a catalyst can be used. Examples are hydrocarbons (e.g., benzene, xylene, heptane, cyclohexane, and decahydronaphthalene); carboxylic acid amides free of hydrogen bonded to nitrogen (e.g., N-methylpyrrolidone, dimethylformamide, and dipropylacetamide); nitriles (e.g., acetonitrile, butyronitrile, and benzonitrile); ethers (e.g., butyl ether and 1,2-dimethoxyethane); and chlorinated hydrocarbons (e.g., chlorobenzene, chloroform, and ethylene chloride). Mixtures of any of the above can be used. When an acid acceptor is used, an excess of it can function as the solvent or as a component of a mixed-solvent system.

Any of the many well-known catalysts for esterification reactions, including urethane formation, and especially for polyesterification reactions, can be used. However, it is not necessary to use a catalyst in any of the processes.

The temperature can vary widely and will depend in part on the nature of the complementary bifunctional reactant of Formula 4, 5, or 6. For compounds of Formulas 5 and 6 and for acid halides and acid cyanides of Formula 4, the processes can take place at temperatures as low as 0° C., although in order for it to proceed at a practical rate, ordinary temperatures (20–30° C.) or higher should be used. The usual range is 20–170° C., temperatures of 50–150° C. being preferred. Temperatures of up to 200° C. and even higher, up to the decomposition point of the reactants and/or products can be used, but no advantage results. To insure as complete a reaction as possible, the temperature is sometimes raised, particularly in the later stages of the reaction period, to as high as about 125–175° C. The process can be carried out at atmospheric, subatmospheric, or superatmospheric pressure; atmospheric pressure is usually used for convenience.

For polymerizations involving carboxylic acids and esters of Formula 4, higher temperatures are required, usually between about 100° C. and the decomposition points of the reactants or products. The preferred range is about 125–275° C. The lower temperatures in this range usually suffice when a known catalyst for esterification or ester interchange is used. Pressure is not a critical factor, but, as in many condensation-polymerization procedures involving removal of water or an alcohol, subatmospheric pressures are frequently used to advantage, especially in the latter stages of the process.

The processes are carried out in standard equipment used for condensation-polymerization reactions.

The time required can vary widely, depending on the reactants, the solvent if one is used, the temperature, and the molecular weight desired. Under suitable conditions for a given set of reactants, polymerization can be complete in as short a time as 15 minutes, although usually the time is 1–24 hours, and in some cases as long as several days. The progress of the polymerization can be followed by taking out small samples of the reaction mixture, determining their infrared absorption spectra, and observing to what extent absorptions characteristic of the reactants have disappeared and absorptions characteristic of the product are present.

It has been stated that the temperature and time for the processes of the invention depend in part on the nature of the complementary bifunctional reactant of Formulas 4, 5, and/or 6. Because of the relative ease of reaction and consequently the lower temperatures and shorter times required when they are used, acid halides are the preferred type of reactant when said reactant is a compound of Formula 4; i.e., the preferred values of Y and Y′ in Formula 4 are halogen. Because of the stability and ease of preparation of intermediates of Formula 4 containing them, chlorine and bromine are the preferred halogens, chlorine being especially preferred because of its relatively low cost. For the same reason, chlorine and bromine are the preferred halogens in intermediates of Formula 6, chlorine again being especially preferred. When the complementary bifunctional reactant is an ester of Formula 4, it is preferred that it be an ester of an aliphatically saturated alcohol of 1–7 carbons, since such esters give polymers more readily. Examples of such alcohols are methyl, ethyl, isopropyl, butyl, isohexyl, heptyl, and benzyl alcohols and phenol and the isomeric cresols.

The polymeric products can be isolated by evaporating any volatile materials present or by drowning the reaction mixture in a non-solvent and filtering, washing, and drying the product. Water, a lower alkanol, or an inert hydrocarbon such as heptane is usually suitable as a non-solvent.

The polymers of the invention are solids or viscous liquids and are stable to air and water.

Inert materials such as dyes, pigments, fillers, delusterants, plasticizers, and antioxidants can be incorporated in the polymers, either by being included in the polymerization mixture or by being mixed with the preformed polymer by known techniques. Polymers containing such additives are included in the products of the invention.

*Preparation of intermediates*

As stated previously, the starting materials for the preparation of the $B_{10}$ and $B_{12}$ intermediates are compounds containing the $B_{10}H_{10}^=$ and $B_{12}H_{12}^=$ anions. These compounds are prepared as follows:

$B_{10}$ *Compounds.*—Ammonium decahydrodecaborate, $$(NH_4)_2B_{10}H_{10}$$

can be prepared in quantitative yield by the reaction of a decaboryl bis(lower dialkyl sulfide), e.g., decaboryl bis(dimethyl sulfide), $B_{10}H_{12}[(CH_3)_2S]_2$, with liquid ammonia at a temperature between about $-50°$ C. and $0°$ C. The product is isolated simply by evaporating any excess, unreacted ammonia. This process is described in detail in Knoth, U.S. Patent 3,148,938, issued Sept. 15, 1964. The decaboryl bis(lower dialkyl sulfide) is prepared by allowing decaborane, $B_{10}H_{14}$, to react with a lower dialkyl sulfide at a temperature of at least $0°$ C., and preferably at least $25°$ C., until approximately one mole of hydrogen per mole of decaborane is evolved. This process is described in detail in Muetterties, U.S. Patent 3,154,561, issued Oct. 27, 1964.

To obtain compounds containing the $B_{10}H_8(OH)_2^=$ ion, $(NH_4)_2B_{10}H_{10}$ is reacted with N-methylpyrrolidone in the presence of concentrated hydrochloric acid at $170°$ C. The compound $B_{10}H_8(N\text{-methylpyrrolidone})_2$ thus produced is heated with sodium hydroxide to give the compound $Na_2B_{10}H_8(OH)_2$. The sodium ion can be exchanged for other cations, e.g., hydrogen (solvated) and tetramethylammonium, by well-known ion-exchange techniques referred to above.

Halogenated $B_{10}$ diols are prepared by direct reaction of the appropriate halogen with an acidic aqueous solution of $H_2B_{10}H_8(OH)_2$, obtained by simply acidifying $Na_2B_{10}H_8(OH)_2$, at $25$–$100°$ C. The extent of halogenation can be controlled by varying the time, temperature, and/or amount of halogen. For example, $$[(CH_3)_4N]_2B_{10}Cl_8(OH)_2$$

is prepared as follows: The alkaline solution of $$Na_2B_{10}H_8(OH)_2$$

obtained as described above is acidified with hydrochloric acid, and chlorine is bubbled through the mixture for 2 hours and 40 minutes, while the temperature rises autogenously from $25°$ C. to $96°$ C. and then falls gradually to $50°$ C., where it is maintained for the rest of the stated period. Addition of concentrated aqueous tetramethylammonium hydroxide causes the product to precipitate as a crystalline solid. If, on the other hand, during the addition of chlorine the mixture is heated gradually to the boiling point over a period of one hour and 10 minutes, and the addition of chlorine is then stopped and the mixture is cooled and treated with tetramethylammonium hydroxide, the product that precipitates is $[(CH_3)_4N]_2B_{10}HCl_7(OH)_2$. These processes are described in Ser. No. 237,392, filed Nov. 13, 1962, in the name of Walter H. Knoth, Jr.

Alkyl and cycloalkyl groups, Q′, can be introduced into the $B_{10}H_8(OH)_2^=$ ion by reacting a solvate, preferably a hydrate, of the acid $H_2B_{10}H_8(OH)_2$ (prepared by ion-exchange from the sodium salt, as previously stated) with the corresponding olefins and cycloolefins at $50$–$100°$ C. The boron-containing acid is strong enough to catalyze this alkylation process in the absence of any other catalyst.

Hydrocarbyloxy groups (—OQ″) and oxygen-interrupted hydrocarbyloxy groups (—OQ‴), in which Q″ and Q‴ are as defined previously, can be introduced into the $B_{10}H_8(OH)_2^=$ ion by reacting a solvate, preferably a hydrate, of the acid $H_2B_{10}H_8(OH)_2$ with the corresponding methyl ethers, $CH_3OQ″$ and $CH_3OQ‴$, at $30$–$80°$ C.

Hydrocarbylthio groups (—SQ″), in which Q″ is as defined previously, can be introduced into the $$B_{10}H_8(OH)_2^=$$

ion by reacting a solvate, preferably a hydrate, of the acid $H_2B_{10}H_8(OH)_2$ with the corresponding disulfides, Q″SSQ″, at ordinary temperatures.

Hydrocarbylcarbonyl groups

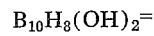

in which Q″ is as defined previously, can be introduced into the $B_{10}H_{10}^=$ ion by reacting the corresponding acyl chlorides,

with a hydrate of the acid $H_2B_{10}H_{10}$ at ordinary temperatures or slightly below. The products can then be dihydroxylated as described above.

Combinations of any of the above-described X substituents can be introduced into polyboron ions by sequential reactions, in which one substituent is introduced first, the product is isolated, another substituent is introduced, the disubstituted product is isolated, and the process is continued until all the desired substituents have been introduced.

$B_{12}$ *Compounds.*—The primary starting material for the preparation of the $B_{12}$ compounds is diborane, $B_2H_6$. Any alkali-metal salt of the acid $H_2B_{12}H_{12}$ can be prepared by the reaction of the appropriate alkali-metal hydroborate, e.g., $NaBH_4$ with diborane in the presence of an ether such as ethyl ether or 1,2-dimethoxyethane. The process is carreid out in a closed system at a temperature of at least 100° C. and at autogenous pressure, which pressure should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as a hydrate, the exact degree of hydration depending on the extent of drying. Hydrates of the acid $H_2B_{12}H_{12}$ can be prepared by simply acidifying the sodium salt with a strong mineral acid such as HCl or by bringing a solution of the sodium salt into contact with an acidic cation-exchange resin. The acid hydrates are isolated by evaporation, the degree of hydration obtained again depending on the extent of evaporation. These processes are described in assignee's copending application Ser. No. 246,636, filed Dec. 21, 1962, in the name of Henry C. Miller and Earl L. Muetterties.

Compounds containing dihydroxy $B_{12}$ anions are prepared by essentially the processes described above for the corresponding $B_{10}$ compounds. Specifically, when an alkaline solution of $Na_2B_{10}H_{10}(OH)_2$ (prepared from $$(NH_4)_2B_{12}H_{12}$$

N-methylpyrrolidone, and sodium hydroxide by the method described for $Na_2B_{10}H_8(OH)_2$ is neutralized with hydrochloric acid, chlorine is passed through the mixture at the reflux tempertaure for 1.5 hours, and aqueous tetramethylammonium hydroxide is added, $$[(CH_3)_4N]_2B_{12}H_2Cl_8(OH)_2$$

precipitates as a crystalline solid and is separated by filtration. Evaporation of the filtrate gives $$[(CH_3)_4N]_2B_{12}H_3Cl_7(OH)_2$$

The foregoing processes are described in Ser. No. 246,636, filed Dec. 21, 1962, in the name of Henry C. Miller and Earl L. Muetterties.

The following examples illustrate the products and processes of the invention. For the sake of simplicity, the equations shown in the various examples are partly schematic, in that they show only the formation of the repeating unit of Formula 1. It is to be understood that the actual product of each example is in fact a polymer containing the repeating unit shown.

EXAMPLE 1

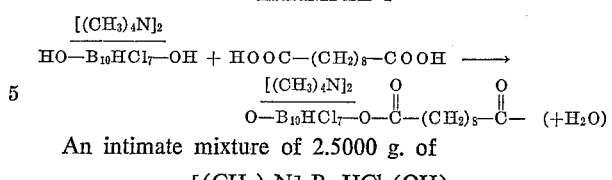

An intimate mixture of 2.5000 g. of $$[(CH_3)_4N]_2B_{10}HCl_7(OH)_2$$

and 0.9361 g. of sebacic acid was heated at 190–200° C. for 18 hours in a tubular glass reactor in an atmosphere of nitrogen. The solid polyester thus formed was soluble in dimethylformamide. Its infrared spectrum (mineral-oil mull) showed strong absorption at $5.9\mu$ (ester C=O). The polymer had an inherent viscosity of 0.07 (0.25% solution in dimethylformamide).

*Analysis.*—Calcd. for $C_{18}H_{41}B_{10}Cl_7N_2O_4$: C, 30.6; H, 5.8; N, 4.0. Found: C, 29.6; H, 5.9; N. 3.8.

Essentially the procedure of Example 1 can be used to make polyesters from the following combinations of polyboron diols, dicarboxylic acids, and copolymer-forming reactants.

| Polyboron Diol(s) | Polycarboxylic Acid(s) |
|---|---|
| $Na_2B_{10}H_8(OH)_2$<br>$Cs_2B_{12}H_{10}(OH)_2$<br>$[CH_3(C_6H_5)_3P]_2B_{12}Br_{10}(OH)_2$<br>$[(\alpha\text{-}C_{10}H_7)_3S]_2B_{10}F_8(OH)_2$ | Adipic acid.<br>Bi(m-carboxyphenyl) ether.<br>1,18-octadecanedioic acid.<br>Succinic acid and 1,2-cyclohexane-dicarboxylic acid. |
| $K_2B_{12}H_5Cl_5(OH)_2$ and $K_2B_{10}H_5Cl_3(OH)_2$<br>$CaB_{12}H_9I(OH)_2$ plus hexamethylene glycol<br>$MgB_{10}H_4Cl_6(OH)_2$<br>Both plus $\epsilon$-hydroxycaproic acid<br>$SrB_{12}H_9(C_2H_5)(OH)_2$ | 1,5-naphthalenedicarboxylic acid.<br>Di(4-carboxybutyl) sulfide.<br>β-Phenyladipic acid.<br>Isophthalic acid. |
| 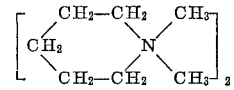 | Methyliminodipropionic acid. |

EXAMPLE 2

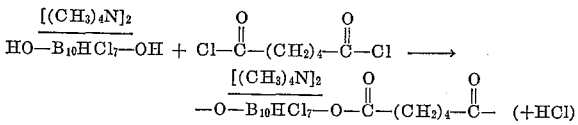

A solution of 3.970 g. of $[(CH_3)_4N]_2B_{10}HCl_7(OH)_2$ and 1.3454 g. of adipoyl chloride in 15 ml. of acetonitrile was kept at ordinary temperature (20–30° C.) for 12 days, during which time a very slow stream of nitrogen was passed through it. The mixture was then heated at 120° C. for one hour and drowned in water. The solid polyester that precipitated was separated by filtration, washed with water, and dried. The polymer was soluble in dimethylformamide. Its infrared absorption spectrum (mineral-oil mull) had strong absorption at $5.8\mu$ (ester C=O). The inherent viscosity of the polymer was 0.28 (0.25% solution in dimethylformamide).

*Analysis.*—Calcd. for $C_{14}H_{33}B_{10}Cl_7N_2O_4$: C, 26.0; H, 5.1; N, 4.3; Cl, 38.2; B, 16.6. Found: C, 26.0; H, 5.1; N, 4.2; Cl, 38.3; B, 15.7.

A sample of the polyester was dissolved in dimethylformamide to give a 10% solution. A copper wire was immersed in the solution and removed, and the solvent was evaporated. This process was repeated three times to build up a thick coating, which was uniform and flexible. Since the polymer used is stable at 300° C., it is especially useful as a high-temperature protective coating for the wire.

EXAMPLE 3

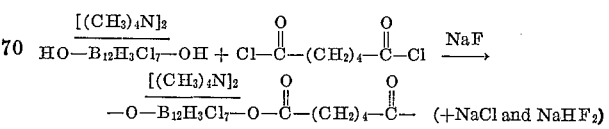

A mixture of 2.9715 g. of $[(CH_3)_4N]_2B_{12}H_3Cl_7(OH)_2$, 0.9599 g. of adipoyl chloride, 30 ml. of acetonitrile, and 2 g. of sodium fluoride was refluxed for four hours at about 80° C. Volatile materials were removed by distillation at 80° C. in a stream of nitrogen at atmospheric pressure, and the residue was drowned in water with agitation in a Waring Blendor. The solid polyester that precipitated was separated by filtration, washed with water, and dried. The polymer was soluble in dimethylformamide. Its infrared absorption spectrum (mineral-oil mull) showed weak absorption at $3.9\mu$ (B—H) and strong absorption at $5.88\mu$ (ester C=O). The inherent viscosity of the polyester was 0.04 (0.25% solution in dimethylformamide).

*Analysis.*—Calcd. for $C_{14}H_{35}B_{12}Cl_7N_2O_4$: C, 24.8; H, 5.2; N, 4.1. Found: C, 23.9; H, 5.2; N, 3.6.

EXAMPLE 4

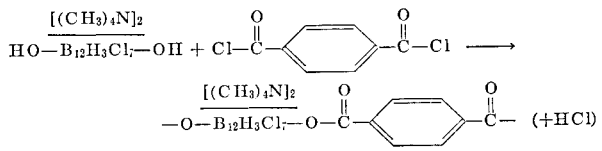

A solution of 1.3773 g. of $[(CH_3)_4N]_2B_{12}H_3Cl_7(OH)_2$, 0.4941 g. of terephthaloyl chloride, and 50 ml. of acetonitrile was heated at 70° C. for three hours under a reflux condenser while a slow stream of nitrogen was passed through the solution. An additional 40 ml. of acetonitrile was added to replace acetonitrile that had volatilized through the condenser, and the solution was heated at 75° C. for four hours and then raised gradually over a period of about one hour to 120° C. as the last of the acetonitrile was volatilized. The resulting mixture was drowned in 5% aqueous sodium carbonate. The solid polyester that precipitated was separated by filtration, washed with water, and dried. Acidification of a sample of the filtrate gave no solid precipitate, which result showed that no terephthalic acid was formed on treatment with water. The polyester was soluble in dimethylformamide. Its infrared absorption spectrum (mineral-oil mull) showed strong absorption at $5.9\mu$ (ester C=O). The inherent viscosity of the polymer was 0.12 (0.25% solution in dimethylformamide).

*Analysis.*—Calcd. for $C_{16}H_{31}B_{12}Cl_7N_2O_4$: C, 27.7; H, 4.5; N, 4.0; Cl, 35.7. Found: C, 27.3; H, 4.6; N, 4.1; Cl, 36.7.

A similar polyester was formed when the same two reactants were polymerized together in acetonitrile solution at 55° C. for 58 hours, a small excess of triethylamine being added at the end of 40 hours. The product had an inherent viscosity of 0.11.

A 10% solution of the product of the polyester of Example 4 in dimethylformamide was allowed to flow out over a steel surface. After removal of the solvent by air-drying, there was obtained an extremely hard and well-adhering coating on the steel. This coating protected the steel against rusting.

A similar 10% solution of the polyester of Example 4 was passed through a column packed with a cation-exchange resin loaded with sodium cations. The effluent liquid, which was a solution of the polyester containing sodium cations in place of tetramethylammonium cations, was concentrated by evaporation at ordinary temperatures and reduced pressures. The residue was mixed with dilute (6 N) hydrochloric acid, and the solution was refluxed for three hours. On cooling, a crystalline precipitate appeared. It was separated by filtration and identified by its infrared absorption spectrum (mineral-oil mull) as terephthalic acid. The filtrate was concentrated on a steam bath until crystals appeared and then was cooled, and the crystals were separated by filtration. The infrared absorption spectrum (mineral-oil mull) of this solid showed that it was essentially $Na_2B_{12}H_3Cl_7(OH)_2$, and that minor amounts of $(H_3O)_2B_{12}H_3Cl_7(OH)_2$ and terephthalic acid were also present.

EXAMPLE 5

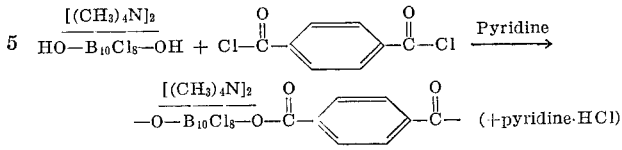

A solution of 5.7429 g. of $[(CH_3)_4N]_2B_{10}Cl_8(OH)_2$ and 2.0308 g. of terephthaloyl chloride in 20 ml. of pyridine was refluxed for two hours (reaction temperature about 115° C.). The mixture was drowned in excess ethyl alcohol with agitation in a Waring Blendor. The solid polyester that precipitated was separated by filtration and dried at 60–70° C. under reduced pressure. The polymer was soluble in N-methylpyrrolidone. Its infrared absorption spectrum showed absorption characteristic of a carboxylic ester, which fact indicated that polyester formation had indeed taken place. The inherent viscosity of the polymer was 0.10 (1% solution in N-methylpyrrolidone).

EXAMPLE 6

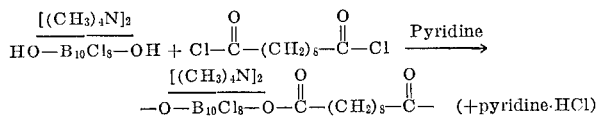

By the method of Example 5, 2.87 g. of $$[(CH_3)_4N]_2B_{10}Cl_8(OH)_2$$

and 1.18 g. of sebacoyl chloride were reacted in 20 ml. of pyridine at 100° C. for three hours. The solid polyester that was isolated was soluble in N-methylpyrrolidone and had an inherent viscosity of 0.10 (1% solution in N-methylpyrrolidone).

EXAMPLE 7

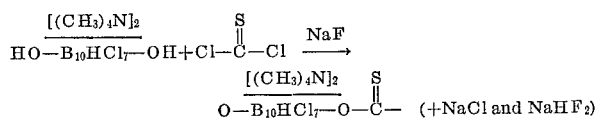

A mixture of 3.7239 g. of $[(CH_3)_4N]_2B_{10}HCl_7(OH)_2$, 0.7745 g. of thiocarbonyl chloride, 11 ml. of acetonitrile, and 2 g. of sodium fluoride was charged to a tubular glass reactor. The reactor was cooled to −78° C., evacuated and sealed at this temperature, heated at 100° C. for three hours and then at 140° C. for two hours, cooled, and opened. The product mixture was drowned in water, and the solid polythiocarbonate that precipitated was separated by filtration, washed with water, and dried. The polyester was soluble in dimethylformamide. Its inherent viscosity was 0.04 (0.25% solution in dimethylformamide).

*Analysis.*—Calcd. for $C_9H_{25}B_{10}Cl_7N_2O_2S$: C, 18.6; H, 4.3; N, 4.8; S, 5.5. Found: C, 18.4; H, 4.6; N, 4.8; S, 2.3.

The infrared spectrum (mineral-oil mull) had a weak band at $4.0\mu$ (B—H) and moderate bands at 5.9 and $6.2\mu$ (>C=S).

The following other polyboron diols, polyacid halides, and copolymer-forming reactants can be reacted according to the general procedure exemplified in Examples 2–7 to give polyesters (including polyurethanes) of the present invention.

| Polyboron Diol(s) | Polyacid Halide(s) |
|---|---|
| [C$_6$H$_5$CH$_2$N(CH$_3$)$_3$]$_2$B$_{10}$H$_5$I$_3$(OH)$_2$ | Oxalyl chloride. |
| [(C$_2$H$_5$)$_3$S]$_2$B$_{12}$H$_6$F$_6$(OH)$_2$ | 1,3-benzenebis (carbamoyl fluoride). |
| Na$_2$B$_{10}$Cl$_8$(OH)$_2$ and Na$_2$B$_{12}$Cl$_{10}$(OH)$_2$ | N,N'-dimethylhexamethylene-bis(carbamoyl chloride). |
| [(CH$_3$)$_4$N]$_2$B$_{10}$H$_4$I$_4$(OH)$_2$ | Carbonyl chloride and adipoyl bromide. |
| [(CH$_3$)$_4$P]$_2$B$_{12}$H$_3$Cl$_7$(OH)$_2$ | Adipoyl chloride. |
| Both plus pivalolactone | Azelaoyl chloride and benzenephosphonic di-chloride. |
| MgB$_{12}$H$_3$Br$_7$(OH)$_2$ | |
| [(i-C$_4$H$_9$)$_4$N]$_2$B$_{12}$H$_8$(OCH$_3$)$_2$(OH)$_2$ | 1,4-benzenediacetyl bromide. |
| Rb$_2$B$_{10}$H$_3$Cl$_3$(SC$_8$H$_{17}$)$_2$(OH)$_2$ | 1,10-decanedicarbonyl chloride. |
| Na$_2$B$_{12}$Br$_4$Cl$_6$(OH)$_2$ | Adipoyl bromide. |

EXAMPLE 8

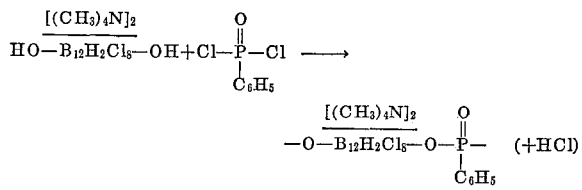

A mixture of 1.1542 g. of [(CH$_3$)$_4$N]$_2$B$_{12}$H$_2$Cl$_8$(OH)$_2$ and 0.3745 g. of benzenephosphonic dichloride was heated in a tubular glass reactor at atmospheric pressure in an atmosphere of nitrogen at 100° C. for 48 hours, and then at 150° C. for three hours. Removal of volatile material at 100° C. and 0.1 mm. gave a solid polyester containing repeating units of the above formula and containing

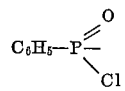

end-groups.

*Analysis.*—Calcd. for C$_{14}$H$_{31}$B$_{12}$Cl$_8$N$_2$PO$_3$: C, 23.2; H, 4.3; N, 3.9; P, 4.3. Found: C, 29.8; H, 4.3; N, 2.7; P, 7.7.

The inherent viscosity of the polymer (0.25% in dimethylformamide) was 0.06.

EXAMPLE 9

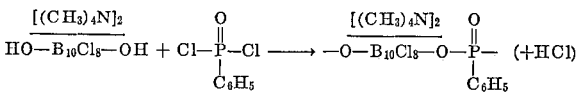

A solution of 3.3203 g. of [(CH$_3$)$_4$N]$_2$B$_{10}$Cl$_8$(OH)$_2$, 1.0345 g. of benzenephosphonic dichloride, and 75 ml. of dimethylacetamide was heated at 160° C. for 3.5 hours under an atmosphere of nitrogen. The solution was cooled and filtered to remove a trace of insoluble material, the filtrate was concentrated under reduced pressure, and the residue was dried at 100° C. and 0.1 mm. The polyester thus obtained was a soft but tack-free solid.

*Analysis.*—Calcd. for C$_{14}$H$_{29}$B$_{10}$Cl$_8$N$_2$O$_3$P: C, 28.6; H, 4.9; N, 4.7; P, 5.3. Found: C, 29.8; H, 5.7; N, 6.6; P, 3.6.

The inherent viscosity (0.25% solution in dimethylformamide) was 0.04. The infrared spectrum (run as a smear) showed bands at 3.3μ, 3.4μ, 3.6μ, 4.05μ, 5.85μ, 6.2μ, 6.8μ, 7.2μ, 7.45μ, broad absorption from 7.95μ to 8.5μ and bands at 8.9μ, 9.9μ, 10.2μ, 10.55μ, 10.95μ, 11.9μ, 13.2μ, 14.0μ, and 14.4μ.

A similar polyester was made from these reactants by heating in the absence of a solvent but in the presence of tributylamine as acid acceptor at 90–130° C. for 77 hours.

EXAMPLE 10

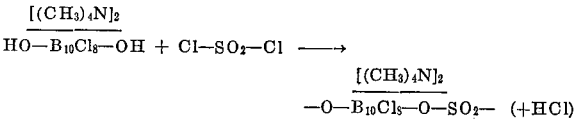

A solution of 4.8573 g. of [(CH$_3$)$_4$N]$_2$B$_{10}$Cl$_8$(OH)$_2$, 1.1420 g. of sulfuryl chloride, and 70 ml. of dimethylacetamide was heated at 80° C. for 18 hours at atmospheric pressure in an atmosphere of nitrogen. The polyester that resulted was worked up by the method of Example 9. It was a white solid, soluble in dimethylformamide, whose infrared spectrum (mineral-oil mull) showed bands at 5.9μ, 6.2μ, 6.9μ, 7.95μ, 8.5μ, and 9.3μ, broad absorption at 9.75μ–10.0μ, and bands at 10.3μ, 10.6μ, 10.9μ, 11.8μ, and 13.8μ.

*Analysis.*—Calcd. for C$_8$H$_{24}$B$_{10}$Cl$_8$N$_2$O$_4$S: C, 15.1; H, 3.8; N, 4.4; S, 5.0. Found: C, 18.3; H, 4.5; N, 5.3; S, 4.3.

EXAMPLE 11

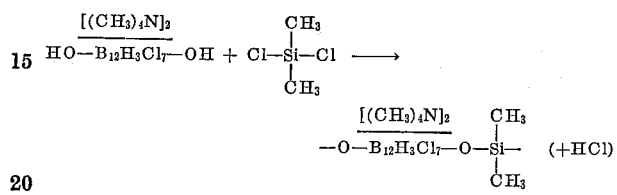

A solution of 3.3295 g. of [(CH$_3$)$_4$N]$_2$B$_{12}$H$_3$Cl$_7$(OH)$_2$, 0.7579 g. of dimethylsilicon dichloride, and 40 ml. of dimethylacetamide was held at atmospheric pressure in an atmosphere of nitrogen at room temperature for 18 hours and then heated at 100° C. for six hours. The resulting polyester was worked up by the procedure of Example 9 and was obtained as a slightly tacky solid (soluble in dimethylformamide). The infrared spectrum (mineral-oil mull) showed absorption at 3.95μ (B—H), 5.9μ, 6.2μ, 8.0μ, 8.6μ, and 9.5μ.

*Analysis.*—Calcd. for C$_{10}$H$_{33}$B$_{12}$Cl$_7$N$_2$O$_2$Si: C, 19.3; H, 5.3; N, 4.5; Si, 4.4. Found: C, 21.4; H, 5.4; N, 4.5; Si, 4.1.

By the general procedure illustrated in Examples 8–11, polyesters can be made from other polyboron diols and inorganic and organo-inorganic acid halides. Examples are the following.

| Polyboron Diol(s) | Acid Halide(s) |
|---|---|
| Na$_2$B$_{10}$Cl$_8$(OH)$_2$ | (C$_2$H$_5$)$_3$PCl$_2$. |
| K$_2$B$_{12}$Br$_{10}$(OH)$_2$ | C$_6$H$_5$CH$_2$PBr$_2$ and C$_6$H$_5$POCl$_2$ |
| [(CH$_3$)$_3$S]$_2$B$_{10}$HCl$_7$(OH)$_2$ | SOCl$_2$ |
| CaB$_{12}$H$_3$Br$_7$(OH)$_2$ and CaB$_{10}$HBr$_7$(OH)$_2$ | SCl$_2$ |

EXAMPLE 12

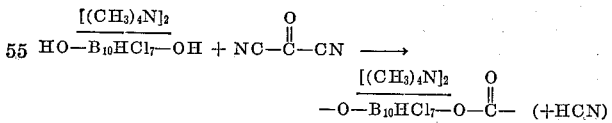

A mixture of 4.971 g. of [(CH$_3$)$_4$N]$_2$B$_{10}$HCl$_7$(OH)$_2$, 0.8183 g. of carbonyl cyanide, and 20 ml. of acetonitrile was refluxed at about 80° C. for 16 hours, after which 2 ml. of dimethylformamide was added to the hot mixture to give a complete solution. The solution was concentrated under reduced pressure, and the polycarbonate thus obtained was washed thoroughly with water and dried. The polymer was soluble in dimethylformamide. Its infrared absorption spectrum showed a fairly strong band at 5.8μ (ester C=O). The inherent viscosity of the polyester was 0.02 (0.25% solution in dimethylformamide).

*Analysis.*—Calcd. for C$_9$H$_{25}$B$_{10}$Cl$_7$N$_2$O$_3$: C, 19.1; H, 4.4. Found: C, 18.9; H, 4.2.

By substituting adipoyl cyanide in place of carbonyl cyanide in the foregoing example, a polyester based on adipic acid is formed.

EXAMPLE 13

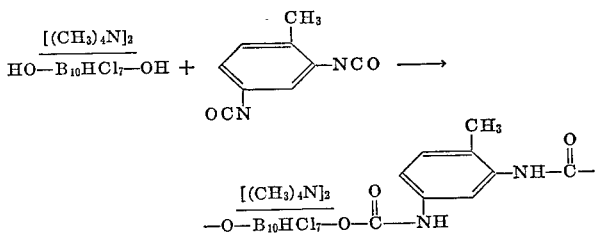

A mixture of 2.7320 g. of [(CH₃)₄N]₂B₁₀HCl₇(OH)₂, 0.8803 g. of 2,4-tolylene diisocyanate, two drops of tin(II) octoate, and 40 ml. of pyridine was refluxed for four hours at about 115° C. at atmospheric pressure. Except for a small amount of gel-like material, which formed almost immediately, a complete solution resulted. Addition of 10 ml. of acetonitrile shortly after refluxing began did not dissolve the gel. Essentially all the gel did dissolve, however, on addition of 10 ml. of dimethylformamide near the end of the reflux period. The polyurethane that was formed was worked up by the procedure of Example 8. The solid polyester was soluble in dimethylformamide. The infrared spectrum (mineral-oil mull) showed weak absorption at 3.0μ (>N—H), weak absorption at 4.0μ (>B—H), and a strong band at 6.01μ (>C=O). The inherent viscosity of the polymer was 0.09 (0.25% solution in dimethylformamide).

A similar polyurethane was obtained when the same two compounds were reacted in dimethylformamide instead of pyridine, with a small amount of tributylamine being added to the tin (II) octoate catalyst.

A 10% solution of the polyurethane of Example 13 in dimethylformamide was allowed to flow out on a steel surface. After removal of the solvent by air-drying, there was obtained a very hard, well-adhering coating on the steel surface. This coating protected the steel against rusting.

A similar 10% solution of the polyurethane in dimethylformamide was passed through a column packed with a cation-exchange resin that was loaded with sodium cations. The effluent liquid, which was a solution of the polyurethane containining sodium cations in place of tetramethylammonium cations, was concentrated by evaporation at ordinary temperature and reduced pressure. It was combined with dilute (6N) hydrochloric acid, and the solution was refluxed for three hours. When the mixture was cooled in ice, a crystalline precipitate appeared and was separated by filtration. This solid was shown by its infrared absorption spectrum (mineral-oil mull) to be essentially Na₂B₁₀HCl₇(OH)₂, containing a minor amount of (H₃O)₂B₁₀HCl₇(OH)₂. The filtrate was made alkaline with sodium hydroxide, whereupon a solid precipitated immediately and was separated by filtration and dried. Its infrared absorption spectrum (mineral-oil mull) showed it to be 2,4-tolylenediamine, i.e., the diamine corresponding to the diisocyanate used to prepare the polyurethane.

EXAMPLE 14

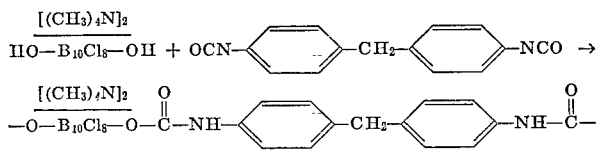

By the method of Example 5, 2.87 g. of

and 1.25 g. of di(p-isocyanatophenyl)methane were reacted in 20 ml. of pyridine at 100° C. for three hours. The polyurethane that resulted was soluble in N-methylpyrrolidone and had an inherent viscosity of 0.18 (1% solution in N-methylpyrrolidone). Its infrared absorption spectrum had bands characteristic of N—H and C=O of a urethane.

By essentially the general procedure exemplified in Examples 13 and 14, other polyboron diols and isocyanates, including isothiocyanates, can be reacted to give polyurethanes of the present invention. Examples are the following.

| Polyboron Diol(s) | Isocyanate(s) |
|---|---|
| K₂B₁₂H₂F₈(OH)₂ | Pentamethylene diisocyanate. |
| Na₂B₁₀H₄F₄(OH)₂ | 1,4-cyclohexylene diisocyanate. |
| CaB₁₂HCl₉(OH)₂ | m-Phenylene diisothiocyanate. |
| BaB₁₀Br₈(OH)₂ | Tetramethylene diisocyanate and tetramethylene diisothiocyanate. |
| [(CH₃)₄N]₂B₁₂H₄I₆(OH)₂ | Di(2-isocyanatoethyl) ether and di(2-isothiocyanatoethyl) sulfide. |
| Li₂B₁₀Cl₆(COCH₃)₂(OH)₂ | Octamethylene diisocyanate. |
| K₂B₁₂H₉(COC₆H₅)(OH)₂ and K₂B₁₂H₁₀(OH)₂ | Decamethylene diisocyanate. |

EXAMPLE 15

A mixture of 2.0053 g. of K₂B₁₂H₁₀(OH)₂ and 1.4562 g. of adipoyl chloride in 25 ml. of dimethylacetamide was stirred under an atmosphere of nitrogen for three hours at 60° C. A complete solution was obtained within the first hour. Triethylamine (2.2 g.) was added, and the solution was heated at 110° C. for three hours. The solution was cooled to room temperature and concentrated to a volume of about 4 ml. at this temperature and 0.1 mm. pressure. The residual mixture was drowned in water, and the extremely viscous material that precipitated was separated mechanically. It was dried at 100° C./0.1 mm. over P₂O₅ to give a solid polyester. The polymer was soluble in dimethylformamide. Its infrared absorption spectrum (smear) showed strong absorption at 4.0μ (B—H), 6μ (ester C=O), and 9.6μ, 10.4μ, 11.6μ, and 13.7μ (B₁₂ polyhedron). Analysis showed that about 82% of the potassium cations had been replaced by triethylammonium ions formed from the triethylamine, i.e., that the product was a polyester having the repeating unit

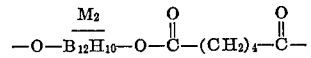

in which about 18% of the cations represented by M were potassium and about 82% were triethylammonium.

*Analysis.*—Calcd. for 18%

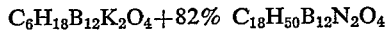

C, 38.3; H, 9.6; K, 3.0. Found: C, 39.57; H, 8.88; K, 2.8.

The triethylammonium cations in the polymer can be replaced by potassium ions by a cation-exchange procedure similar to those of Examples 4 and 13.

Utility

The polymers of the invention are generically useful as coating compositions, as illustrated in Examples 2, 4, and 13.

The polymers of this invention can be molded into shaped articles from solution or by thermal techniques. The molded articles thus produced are useful in many applications, for example, as light-transparent neutron barriers and space-vehicle windows resistant to outer-space radiation.

The polymers of this invention are generically useful as components of solid high-energy fuels.

The higher-molecular-weight polymers of the invention (i.e., those having molecular weights of about 10,000 or higher), and particularly the copolymers containing appreciable amounts of recurring units based on boron-free dicarboxylic acids, can be spun into fibers useful in a broad range of textiles.

The polymers of the invention are generically useful as cation-exchange resins or components thereof.

The polymers of the invention, particularly those having molecular weights of about 10,000 or lower are generically useful for making adhesives.

As many apparently widely different embodiments of this invention may be made without departing from the spirit and scope thereof, it is to be understood that this invention is not limited to the specific embodiments thereof described herein.

The embodiments of the invention in which an exclusive property or privilege is claimed are defined as follows:

1. A boron-containing polymer consisting essentially of recurring units of the formula

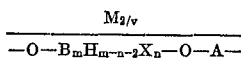

wherein:
M is a cation;
$v$ is the valence of M;
$2/v$ is the ration of M groups to one $-B_mH_{m-n-2}X_n-$ group;
X is a monovalent group selected from the class consisting of halogen, $-Q'$, $-OQ''$, $-OQ'''$, $-SQ''$ and $COQ''$, wherein $Q'$ is selected from the class consisting of alkyl and cycloalkyl each of at most 12 carbon atoms, $Q''$ is aliphatically saturated hydrocarbyl of at most 12 carbon atoms, and $Q'''$ is aliphatically saturated hydrocarbyl of at most 12 carbon atoms interrupted by one oxygen atom;
$m$ is a cardinal number selected from the class consisting of 10 and 12;
$n$ is a cardinal number of from 0 to $m-2$, inclusive; and A is selected from the class consisting of (a) a divalent group remaining after removal of two acid halogens from a poly(carbacyl halide) having at most 18 carbon atoms, and (b) a divalent group remaining after removal of two acid halogens from a poly(acid halide) of a poly(oxy acid) whose central atom is an element of atomic number 14–16, inclusive.

2. The boron-containing polymer of claim 1 wherein said recurring units are the sole recurring units.

3. The boron-containing polymer of claim 1 which contains additional recurring units, that do not exceed 50 mole percent of the total recurring units, derived from polymerizable compounds containing up to 18 carbon atoms free of ethylenic and acetylenic carbon-to-carbon unsaturation selected from the class consisting of lactones, monohydroxymonocarboxylic acids, monomercaptomonocarboxylic acids, and glycols.

4. The boron-containing polymer of claim 1 wherein A has the formula

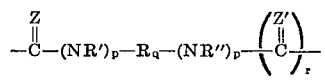

wherein
Z and Z' each are selected from the class consisting of oxygen and sulfur;
R' and R'' are selected from the class consisting of, individually, (a) hydrogen, and (b) aliphatically saturated hydrocarbyl of 1–8 carbon atoms selected from the group consisting of alkyl, cycloalkyl, alkylcycloalkyl, cycloalkylalkyl, aryl, aralkyl, alkaryl and alkaralkyl, and, when taken together, (c) alkylene of up to 8 carbon atoms.
R is a divalent group of 2–16 carbon atoms selected from the class consisting of alkylene, cycloalkylene, cycloalkylenedialkylene, alkylenebis(cycloalkylene), arylene, aralkylene, alkarylene, alkylenediarylene, and arylenedialkylene, in which any carbon chain can be interrupted by up to two separated heteroatoms selected from the class consisting of oxygen, sulfur, and nitrogen, said heteroatoms being removed by at least one carbon from the functional groups bonded to R;
$p$, $q$ and $r$ are each cardinal numbers of 0 to 1, inclusive, $r$ being 0 only when $p$ and $q$ are 0.

5. The boron-containing polymer of claim 4 wherein $p$ and $q$ are each zero.

6. The boron-containing polymer of claim 4 wherein $r$ is 1, Z and Z' each are oxygen, and R' and R'' each are hydrogen.

7. A boron-containing polymer consisting essentially of recurring units of the formula

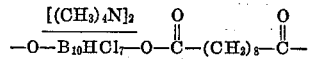

8. A boron-containing polymer consisting essentially of recurring units of the formula

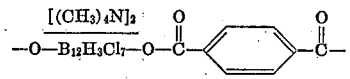

9. A boron-containing polymer consisting essentially recurring units of the formula

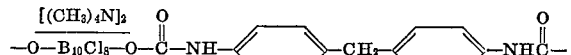

10. A boron-containing polymer consisting essentially of recurring units of the formula

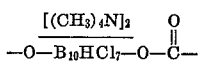

11. A boron-containing polymer consisting essentially of recurring units of the formula

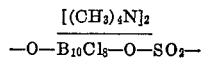

12. Process which comprises reacting at least one boron compound of the formula

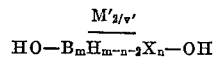

wherein
M' is a cation selected from the group consisting of a metal, $U_2U'NH^+$, $U_3U'N^+$, $U_4P^+$ and $U_3S^+$ wherein U' is aliphatically saturated hydrocarbyl of at most 12 carbon atoms, U is aliphatically saturated hydrocarbyl bonded to the nitrogen through aliphatic carbon, and any two U and U' groups in one cation can be joined together to form a divalent group of up to 12 carbon atoms selected from the class consisting of alkylene and oxygen-interrupted alkylene;
$v'$ is the valence of the cation M';
X is a monovalent group selected from the class consisting of halogen, $-Q'$, $-OQ''$, $-OQ'''$, $-SQ''$ and $COQ''$, wherein $Q'$ is selected from the class consisting of alkyl and cycloalkyl each of at most 12 carbon atoms, $Q''$ is aliphatically saturated hydrocarbyl of at most 12 carbon atoms, and $Q'''$ is aliphatically saturated hydrocarbyl of at most 12 carbon atoms interrupted by one oxygen atom;
$m$ is a cardinal number selected from the group consisting of 10 and 12; and
$n$ is a cardinal number of 0 to $m-2$, inclusive, with at least one coreactant selected from the class consisting of
(A) a reactant of at most 18 carbon atoms containing at least two functional groups of the class consisting of carboxyl and ester-forming derivatives thereof, thiocarboxyl and ester-forming derivatives thereof, isocyanato, and isothiocyanato, any inert portion of said reactant being bonded to said functional groups through an element of atomic number 6 to 7, and
(B) a reactant containing at least two acid halide groups bonded to an element of atomic number 14 to 16, inclusive;
said reaction being carried out at a temperature of between about 20° C. and 200° C., provided that when the coreactant contains functional groups selected from the class consisting of carboxyl and esters thereof, the temperature will be between about 100° C. and 275° C.

13. The process of claim 12 in which a polymerizable monomer containing up to 18 carbon atoms free of ethylenic and acetylenic carbon-to-carbon unsaturation selected from the class consisting of lactones, monohydroxymonocarboxylic acids, monomercaptomonocarboxylic acids, and glycols, is present as an additional reactant, said reactant being present in amounts which do not exceed 50 mole percent of the total reactants present.

14. The boron-containing polymer of claim 1 wherein A has a formula selected from the class consisting of

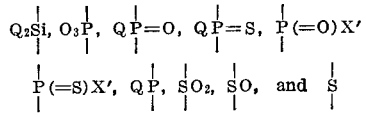

wherein X' is halogen and Q is of up to 10 carbon atoms and is selected from the class consisting of alkyl, cycloalkyl, alkylcycloalkyl, cycloalkylalkyl, aryl, aralkyl, alkaryl and alkaralkyl.

References Cited
UNITED STATES PATENTS

| | | | |
|---|---|---|---|
| 2,931,788 | 5/1960 | Hoffman et al. | 260—870 |
| 3,099,629 | 7/1963 | Heubsch | 260—78 |
| 3,167,590 | 1/1965 | Heying | 260—606.5 |
| 3,214,466 | 10/1965 | Green et al. | 260—2 |
| 3,258,479 | 6/1966 | Alexander et al. | 260—75 |

WILLIAM H. SHORT, *Primary Examiner.*

C. A. WENDEL, L. P. QUAST, *Assistant Examiners.*

UNITED STATES PATENT OFFICE
CERTIFICATE OF CORRECTION

Patent No. 3,328,355          Dated June 27, 1967

Inventor(s) James W. Dawes and John C. Sauer

It is certified that error appears in the above-identified patent and that said Letters Patent are hereby corrected as shown below:

Col. 1, line 35, the formula should read $$-- \quad \frac{M_{2/v}}{-O-B_m H_{m-n-2} X_n -O-} \quad --;$$

line 38, insert a comma following "valence v";

Col. 7, line 41, "4,4'-diphenyl-" should be -- 4,4'-biphenyl- --;

Col. 13, line 54, insert a -- ) -- following the formula line 56, -- temperature -- is misspelled;

Table spanning columns 13 and 14, -- Both plus ε-hydroxycaproic acid -- should be placed between "$MgB_{10}H_4Cl_6(OH)_2$" and "β-Phenyladipic acid."; the brace in the right hand column should be removed;

Col. 17, right hand column of the table, -- Both plus pivalolactone -- should be between the formula immediately above it and -- Adipoyl chloride. --; the brace should be removed from the right hand column of this table;

Col. 21, formula between lines 10 and 12 should read:

$$-- \quad \frac{M_{2/v}}{-O-B_m H_{m-n-2} X_n -O-A-} \quad --;$$

line 17, "ration" should be -- ratio --; line 23, "Q'" should be -- Q'' --; line 64, "216" should be -- 2 - 16 --; and Col. 22, line 35, the formula should read:

$$-- \quad \frac{M'_{2/v'}}{HO-B_m H_{m-n-2} X_n -OH} \quad --;$$

Signed and sealed this 1st day of May 1973.

(SEAL)